UNITED STATES PATENT OFFICE 2,404,536

ALKYLATION OF HYDROCARBONS

Louis Schmerling and Vladimir N. Ipatieff, Chicago, Ill., assignors to Universal Oil Products Company, Chicago, Ill., a corporation of Delaware No Drawing. Application June 13, 1942,
Serial No. 446,930

6 Claims. (Cl. 260—671)

This invention relates to catalytic processes involving the addition of alkyl substituent groups to hydrocarbons. The invention is specifically concerned with the use of new types of catalysts for increasing the rates of reaction between aromatic hydrocarbons which are to be alkylated and the compounds serving as the source of the alkyl groups.

It is recognized that the alkylation of aromatic and paraffinic hydrocarbons has already been accomplished by the use of various types of catalysts such as, for example, mineral acids including sulfuric and phosphoric acids and metal halide catalysts of the Friedel-Crafts type. Both mono- and poly-nuclear aromatics have been alkylated directly with olefins or with compounds which yield alkyl groups such as alcohols and esters. The catalysts which form the essential subject matter of the present invention are capable of being applied to substantially all of these types of alkylation reactions although obviously the different catalysts will have different degrees of effectiveness in a given alkylation reaction involving, on the one hand, particular aromatics and mixtures of such hydrocarbons and, on the other hand, the different compounds which serve as sources of the alkyl groups. The present invention is concerned with processes in which aromatic hydrocarbons are alkylated in the presence of modified catalysts of the Friedel-Crafts type which possesses the general advantage of having a lower tendency toward the formation of hydrocarbon-metal halide complexes of generally inferior catalytic activity.

In one specific embodiment the present invention comprises a process for the introduction of alkyl substituent groups into the nucleus of aromatic hydrocarbons which consists in contacting aromatic hydrocarbons and compounds serving as a source of said alkyl groups in the presence of catalyst composites formed by interacting aliphatic carboxylic acids or their corresponding anhydrides with metal halide catalysts of the Friedel-Crafts type.

We have found that catalysts having activity in promoting the alkylation of aromatic hydrocarbons may be formed by interacting different aliphatic carboxylic acids and certain metal halide catalysts of the Friedel-Crafts type. By choosing different acids of the broad class mentioned and interacting them with different representatives of the metal halide group, a large number of alternatively utilizable catalysts can be manufactured although their activity in different alkylation reactions will vary over a considerable range. While the catalysts may be formed by interacting either the acids themselves or their anhydrides, advantages are frequently gained by using the anhydrides rather than the acids which may vary in molecular weight from that of acetic acid up to those acids having the molecular weight of stearic acid or even higher. Among the metal halides the most generally utilizable compound is aluminum chloride although the other halides of aluminum and particularly the bromide are usable and also the halides and particularly the chlorides of zinc, iron, and zirconium. While the invention generally contemplates the use of catalysts produced by interacting one acid or its anhydride with a single metal halide, catalysts may be produced by reacting more than one acid with one metal halide or one acid with more than one metal halide. The composite catalysts thus produced have been found to possess generally high activity in processes involving the selective alkylation of aromatics with olefins with reduced tendencies in the direction of olefin polymerization and in the direction of forming metal halide-hydrocarbon complexes the presence of which has a tendency to lower the catalytic activity below that of the original catalyst. It is generally preferable in conducting alkylation reactions in accordance with the present invention to employ molar excesses of aromatic hydrocarbon at all times and to conduct the reactions in the presence of minor amounts of a hydrogen halide.

When an aliphatic acid is reacted with a metal halide catalyst of the Friedel-Crafts type, a series of reactions apparently takes place depending upon the molal equivalents of the metal halide employed in respect to the acid. In the case of the interaction of acetic anhydride, for example, with aluminum chloride, the first mole of aluminum chloride evidently forms acetyl chloride and a complex according to the following equation:

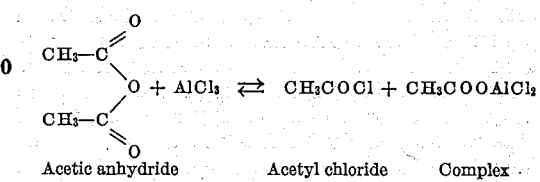

Acetic anhydride     Acetyl chloride     Complex

When another mole of aluminum chloride is added, there is a formation of a complex with the acetyl chloride which apparently proceeds according to the following equation:

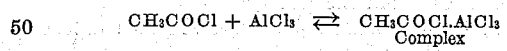

When a third mole of aluminum chloride is added the primary complex shown in the first equation is converted into an acylating complex.

By analogous interactions between other acids or anhydrides of aliphatic acids and other Friedel-Crafts metal halides, similar reaction products are formed which have been found to have applicability to increasing the rate of the alkylation of aromatic hydrocarbons with olefins and other compounds capable of supplying alkyl substituent groups. The activity of the composites increases generally as the amount of metal halide increases but, if this increase goes beyond a certain definite point, the composites begin to function as the metal halides themselves and beyond this the advantages inherent in the use of the complex may be lost.

The present types of catalysts are preferably made by thoroughly and quickly mixing an acid anhydride and a metal halide such as aluminum chloride at a relatively low temperature at which the reaction (which is usually vigorous) can be controlled and the composites are recovered in powdered form, in which condition they can be used directly or in the form of larger particles made by pelleting or otherwise forming the powders.

In the operation of the process wherein an aromatic hydrocarbon or a mixture of aromatic hydrocarbons is reacted with an alkylating compound, a simple batch procedure involves suspending a portion of a powdered catalyst composite prepared in accordance with the procedures above outlined in the liquid hydrocarbon to be alkylated and gradually introducing an olefin or a mixture of olefins into the suspension during thorough mixing to insure good contact between the aromatic and the olefin. Successful alkylations are frequently obtainable at ordinary temperatures and pressure but higher temperatures may be employed to accelerate the reaction, as long as the temperature used is below that at which undesirable decomposition reactions occur or there is too great a tendency for the formation of hydrocarbon-metal halide complexes. In the case of aromatic hydrocarbons which are normally solid, these may be alkylated at temperatures high enough to bring them to a molten condition or they may be dissolved in some neutral solvent to insure liquid phase conditions.

Continuous operations may be conducted by well-known procedures. For example, a suspension of powdered catalyst in an aromatic hydrocarbon may be passed through a reactor of a tubular variety which is provided with baffles to insure turbulence and an alkylating compound introduced at various points along the line of flow after which the products are subjected to fractionation for recovery of desired alkylated products and unreacted hydrocarbons which latter may be returned to further reaction in the primary alkylating zone in the presence of fresh catalyst or separated and recirculated catalyst if it has retained sufficient catalytic activity. Continuous operations may also be conducted by such procedures as allowing the liquid aromatic to flow downwardly over a bed of granular catalyst while an alkylating compound in vapor phase is passed upwardly counter-current to the descending stream of aromatic hydrocarbon.

The following illustrative data are introduced to show an instance of the manufacture of a catalyst typical of those preferred for use in the present process and also for indicating the character of the results obtainable in the use of such a catalyst. However, it is not intended that the scope of the invention should be restricted in exact accordance with the particular data presented.

A catalyst was made by reacting equimolar proportions of acetic anhydride and aluminum chloride. Thus, 65 parts by weight of finely divided substantially anhydrous aluminum chloride was prepared and to the powdered material 50 parts by weight of acetic anhydride were added and the mass thoroughly mixed. The evolution of acetyl chloride was noted and mixing and kneading was continued while the temperature was increased to 60° C. The composite material thus produced was readily reduced to a finely divided powder by grinding in the absence of moisture.

20 parts by weight of the catalyst powder thus prepared was suspended in 100 parts by weight of benzene, and propylene was gradually introduced to the suspension at a temperature of 60° C. On continued introduction of propylene into the liquid hydrocarbon all of the benzene was finally alkylated, the proportion of monoisopropyl benzene to more highly propylated compounds being about 2:1 when 50 percent of the benzene had reacted. As the introduction of propylene was continued beyond this point the yield of polyalkylated products increased sharply and best results were observed when the reaction was stopped at about the 50% point and the products fractionated so that the unreacted benzene could again be employed in the absence of its propylated derivatives.

We claim as our invention:

1. An alkylation process which comprises reacting an aromatic hydrocarbon with a compound capable of yielding an alkyl radical, in the presence of a catalyst comprising a catalytic compound having the general formula $RCOOMX_n$ wherein R is an alkyl group, X a halogen, $n$ an integer less than 4 and M a metal capable of forming a metal halide of the Friedel-Crafts type.

2. An alkylation process which comprises reacting an aromatic hydrocarbon with an olefin in the presence of a catalyst comprising a catalytic compound having the general formula $RCOOMX_n$ wherein R is an alkyl group, X a halogen, $n$ an integer less than 4 and M a metal capable of forming a metal halide of the Friedel-Crafts type.

3. An alkylation process which comprises reacting benzene with a compound capable of yielding an alkyl radical, in the presence of a catalyst comprising a catalytic compound having the general formula $RCOOMX_n$ wherein R is an alkyl group, X a halogen, $n$ an integer less than 4 and M a metal capable of forming a metal halide of the Friedel-Crafts type.

4. An alkylation process which comprises reacting an aromatic hydrocarbon with an olefin in the presence of a catalyst comprising a catalytic compound having the formula $$CH_3COOAlCl_2$$

5. An alkylation process which comprises reacting an aromatic hydrocarbon with an olefin in the presence of a catalyst comprising a catalytic compound having the formula $$CH_3COOAlX_2$$

wherein X is a halogen.

6. An alkylation process which comprises reacting an aromatic compound with an olefin in the presence of a catalyst comprising a catalytic compound having the formula $RCOOAlX_2$ wherein R is an alkyl group and X a halogen.

LOUIS SCHMERLING.
VLADIMIR N. IPATIEFF.